United States Patent
Tatsuzawa et al.

(10) Patent No.: US 7,379,408 B2
(45) Date of Patent: May 27, 2008

(54) DISK APPARATUS AND METHOD USING PLURAL TAP COEFFICIENT EQUALIZATION

(75) Inventors: Yukiyasu Tatsuzawa, Yokohama (JP);
Koichi Otake, Yokohama (JP);
Hideyuki Yamakawa, Kawasaki (JP);
Hiroyuki Moro, Ome (JP); Toshihiko Kaneshige, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 574 days.

(21) Appl. No.: 11/012,066

(22) Filed: Dec. 15, 2004

(65) Prior Publication Data

US 2005/0141378 A1    Jun. 30, 2005

(30) Foreign Application Priority Data

Dec. 25, 2003    (JP) .............................. 2003-431033

(51) Int. Cl.
*G11B 7/00*    (2006.01)
(52) U.S. Cl. .................................. 369/59.22; 369/53.19
(58) Field of Classification Search ..................... None
See application file for complete search history.

(56) References Cited

U.S. PATENT DOCUMENTS

| | | | | |
|---|---|---|---|---|
| 5,546,367 | A * | 8/1996 | Yoshimura et al. | 369/53.19 |
| 6,477,125 | B1 * | 11/2002 | Hayami | 369/59.22 |
| 6,618,338 | B1 * | 9/2003 | Fujiwara et al. | 369/59.22 |
| 6,618,740 | B1 | 9/2003 | Staszewski | |
| 6,678,230 | B2 * | 1/2004 | Miyashita et al. | 369/53.16 |
| 6,876,618 | B2 * | 4/2005 | Tonami et al. | 369/59.21 |
| 7,184,381 | B2 * | 2/2007 | Ohkubo et al. | 369/59.22 |

FOREIGN PATENT DOCUMENTS

| JP | 06237147 A | * | 8/1994 |
|---|---|---|---|
| JP | 2001-195830 | | 7/2001 |

OTHER PUBLICATIONS

Journal of the Institute of Electronics, Information and Communication Engineers, vol. 81, No. 5, pp. 497-505, May 1998.

* cited by examiner

*Primary Examiner*—William Korzuch
*Assistant Examiner*—Peter Vincent Agustin
(74) *Attorney, Agent, or Firm*—Pillsbury Winthrop Shaw Pittman, LLP (57) ABSTRACT

A disk apparatus has an equalizing unit which performs PR equalization for the read signal from the disk based on a plurality of tap coefficients, a decoding unit which performs a decoding process for the equalized read signal, a calculating unit which obtains an ideal signal of the decoded read signal, and compares the ideal signal with the decoded read signal, thereby calculating an error signal E, and a control unit which groups the tap coefficients into at least a first and second coefficient groups which are groups of tap coefficients at symmetrical locations each, and determines tap coefficients of the first coefficient group in a range of a first limit value K1 according to the calculated error signal, determines tap coefficients of the second coefficient group in a range of a second limit value and supplies the determined tap coefficients to the equalizing unit.

18 Claims, 8 Drawing Sheets

DISK APPARATUS AND METHOD USING PLURAL TAP COEFFICIENT EQUALIZATION

CROSS-REFERENCE TO RELATED APPLICATIONS

This application is based upon and claims the benefit of priority from prior Japanese Patent Application No. 2003-431033, filed Dec. 25, 2003, the entire contents of which are incorporated herein by reference.

BACKGROUND OF THE INVENTION

1. Field of the Invention

The present invention relates to a disk device and a disk reproducing method, and more particularly, to a disk apparatus and a disk reproducing method concerning limitation on coefficient control of a waveform equalizing circuit of a reproducing system.

2. Description of the Related Art

Recently, an optical disk recording and reproducing apparatus such as a DVD (Digital Versatile Disc) has been widely known, and research and development of a variety of schemes have been made and a plenty of products have been commercially available.

In particular, in recent years, in the field of optical recording and reproduction as well, recording with high density has been underway, and the recording density in a linear direction has been significantly increased. Since a laser wavelength is reduced, and a degree of aperture of a lens is increased, deterioration of a reproducing signal quality due to a tangential tilt becomes significant. Therefore, in order to solve these problems, development of a PRML (Partial Response and Maximum Likelihood) signal processing scheme is actively made.

The PRML signal processing system achieves a reproducing system which does not require a high bandwidth component by applying a PR scheme for intentionally adding waveform interference in a reproducing system in which an amplitude of the high bandwidth component deteriorates and a signal to noise ratio increases due to an increase of the recording density in a linear recording direction. In addition, this scheme improves a quality of reproducing data by using a likelihood decoding technique for estimating the most probable sequence by probability calculation considering the waveform interference. In this PRML scheme, a plenty of PR classes are produced from the shape of given waveform interference. In particular, in an optical disk apparatus, there is used a PRML scheme which corresponds to a response such as PR(1, 1), PR(1, 1, 1), PR(1, 1, 1, 1), PR(1, 2, 2, 1), PR(3, 4, 4, 3), or PR(, 2, 2, 2, 1).

In patent document 1 (Jpn. Pat. Appln. KOKAI Publication No. 2001-195830), a PRML signal processing scheme in the above-described optical disk apparatus is disclosed in detail.

In the meantime, in the case of utilizing the PRML signal processing scheme, it is necessary to carry out a waveform equalizing process called PR equalization in order to eliminate a waveform distortion of a reproducing waveform and make it close to an equalization characteristic of a target PR class. In general, an adaptive equalizer having a learning function is used for this waveform equalizing process.

In non-patent document 1 (Journal of the Institute of Electronics, Information Communication Engineers, Vol. 81. No. 5, pp. 497 to 505, May, 1998), adaptive equalizers are described in detail. Among them, in particular, an adaptive equalizer using an LMS (Least Mean Squares) algorithm for updating a tap coefficient so as to minimize a square average value of an equalization error is practically used for an optical apparatus as a scheme which can be achieved with a simple configuration.

However, in the above-described prior, it cannot be considered that adequate countermeasure is taken in view of divergence of a tap coefficient and prevention of error convergence in the optical disk apparatus. That is, the divergence of an adaptive leaning or incorrect convergence that the adaptive leaning incorrectly converges at a point which is different from a target equalization characteristic occurs for the reasons stated below.

First, in an optical disk recorded with high density, in response to a channel rate of a reproducing signal, a high bandwidth component in a bandwidth of the reproducing signal is greatly eliminated with an MTF (Mutual Transfer Function) characteristic. Thus, pseudo convergence may occur at a point close to the target PR class characteristic while this high bandwidth portion is forcibly emphasized. In the view of a circuit, since the value of each coefficient cannot be changed infinitely, a limitter is applied to any coefficient anywhere. Then, convergence occurs in a state in which an equalization error is reasonable or divergence occurs, making it impossible to return to an intrinsic characteristic. In actuality, such a state exists in plurality.

Secondly, in the case where a nonlinear factor or a disturbance factor such as a tangential tilt, asymmetry, a phase error, or defect has been temporarily inputted greater than expected, a learning operation advances so as to correct this factor, and a coefficient learns in a direction in which such a factor is eliminated. As a result, there is a danger that pseudo convergence occurs in a characteristic which is not an intrinsic target characteristic, and an original state cannot be returned again. In addition, it is not unusual that the weighting of a tap which should be essentially central is reduced, a characteristic is produced with only another tap, or convergence occurs around another tap.

Thirdly, in the case where the PRML signal processing is composed of a plurality of loops, another loop such as gain control, offset/asymmetry control, or phase control exists at the outside of a loop of an adaptive equalizer. Thus, there is a case where an adaptive leaning operation becomes unstable due to an operating collision.

As has been described above, in an adaptive equalizer, a problem with divergence of leaning or incorrect convergence can occur due to a variety of factors. As an approach for solving such a problem, there is conventionally known a method for limiting a degree of freedom of a tap coefficient. For example, there is used a method for fixing a central tap coefficient to be present to a stable value obtained by experimentally calculating the central tap coefficient, or alternatively, disabling learning of some tap coefficients. Further, there is proposed a method for carrying out leaning while maintaining symmetry of tap coefficients in order to retain a linear phase characteristic.

In patent document 1, there is disclosed an example for preventing divergence while providing a degree of freedom by providing a margin to limitation on updating between symmetrical tap coefficients in the optical disk apparatus.

Further, patent document 2 (U.S. Pat. No. US6,618, 740B1) exists.

However, in a prior art of patent document 1, if limitation is thus strictly applied to a leaning operation, a degree of freedom corresponding to a target characteristic is also lost. Therefore, there is a possibility that an equalization error quantity at a convergence point cannot be sufficiently reduced. In addition, as in a prior art of patent document 2, an attempt has been made to increase a degree of freedom while providing a limitation on updating between symmetrical tap coefficients. However, this attempt is not always considered to have a high degree of freedom because limit values between all the tap coefficients are identical to each other. Further, there has been a problem that a sufficient result can be obtained in the case where an attempt has been made to correct a specified amount of a tangential tilt or asymmetry etc. by an adaptive equalizer. In addition, in the case of an optical disk apparatus, there exist a plurality of standards for optical disks with different recording densities. In the case where reproduction is carried out by a single apparatus in accordance with these standards, there has been a problem that the specified amount must be changed according to the characteristics of their respective reproducing disks.

BRIEF SUMMARY OF THE INVENTION

An embodiment of the present invention is a disk apparatus comprises a reading unit which reads reflection light from a disk and outputs a read signal; an equalizing unit which carries out PR equalization for the read signal based on a plurality of tap coefficients; a decoding unit which carries out a decoding process for the read signal equalized by the equalizing unit; a calculating unit which obtains an ideal signal of the decoded read signal, and compares the ideal signal and the decoded read signal with each other, thereby calculating an error signal; and a control unit which groups the tap coefficients into at least a first coefficient group and a second coefficient group which are groups of tap coefficients at symmetrical locations each, and determines tap coefficients of the first coefficient group at least in a range of a first limit value according to the calculated error signal, determines tap coefficients of the second coefficient group in a range of a second limit value which is different from the first limit value, and supplies the determined tap coefficients to the equalizing unit, thereby controlling an equalizing process.

DETAILED DESCRIPTION OF THE INVENTION

Figure 1:
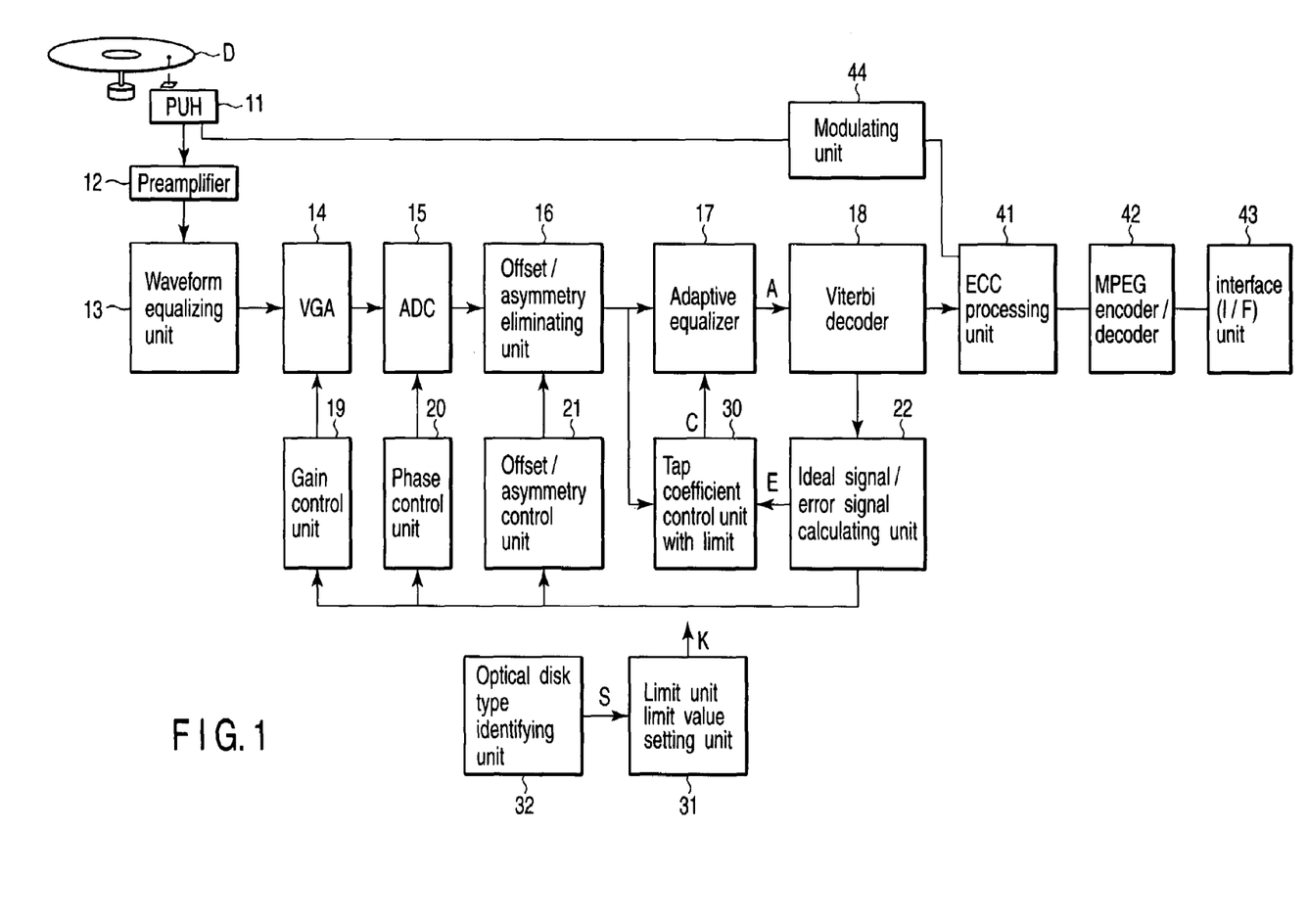
FIG. 1 is a block diagram depicting an example of a configuration of an optical disk apparatus according to the present invention.
Figure 2:
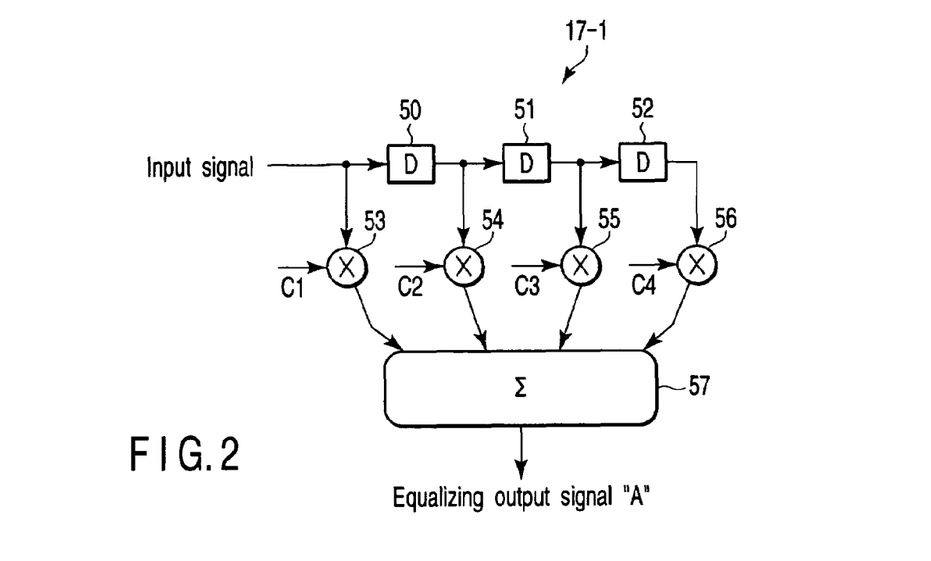
FIG. 2 is a block diagram depicting an example of a configuration of an even numbered tap adaptive equalizer in the optical disk apparatus according to the invention.
Figure 3:
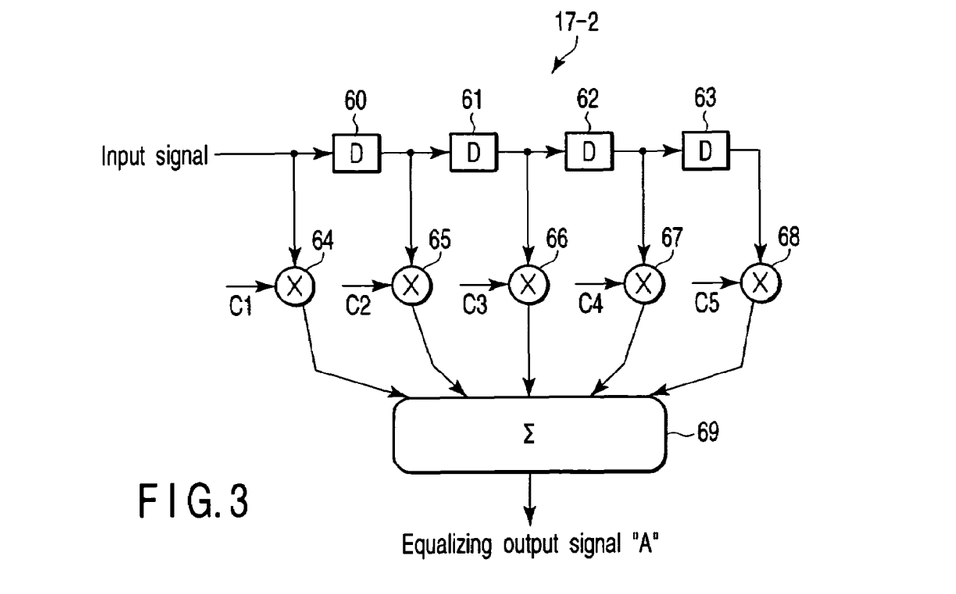
FIG. 3 is a block diagram depicting an example of a configuration of an odd numbered adaptive equalizer in the optical disk apparatus according to the invention.
Figure 4:
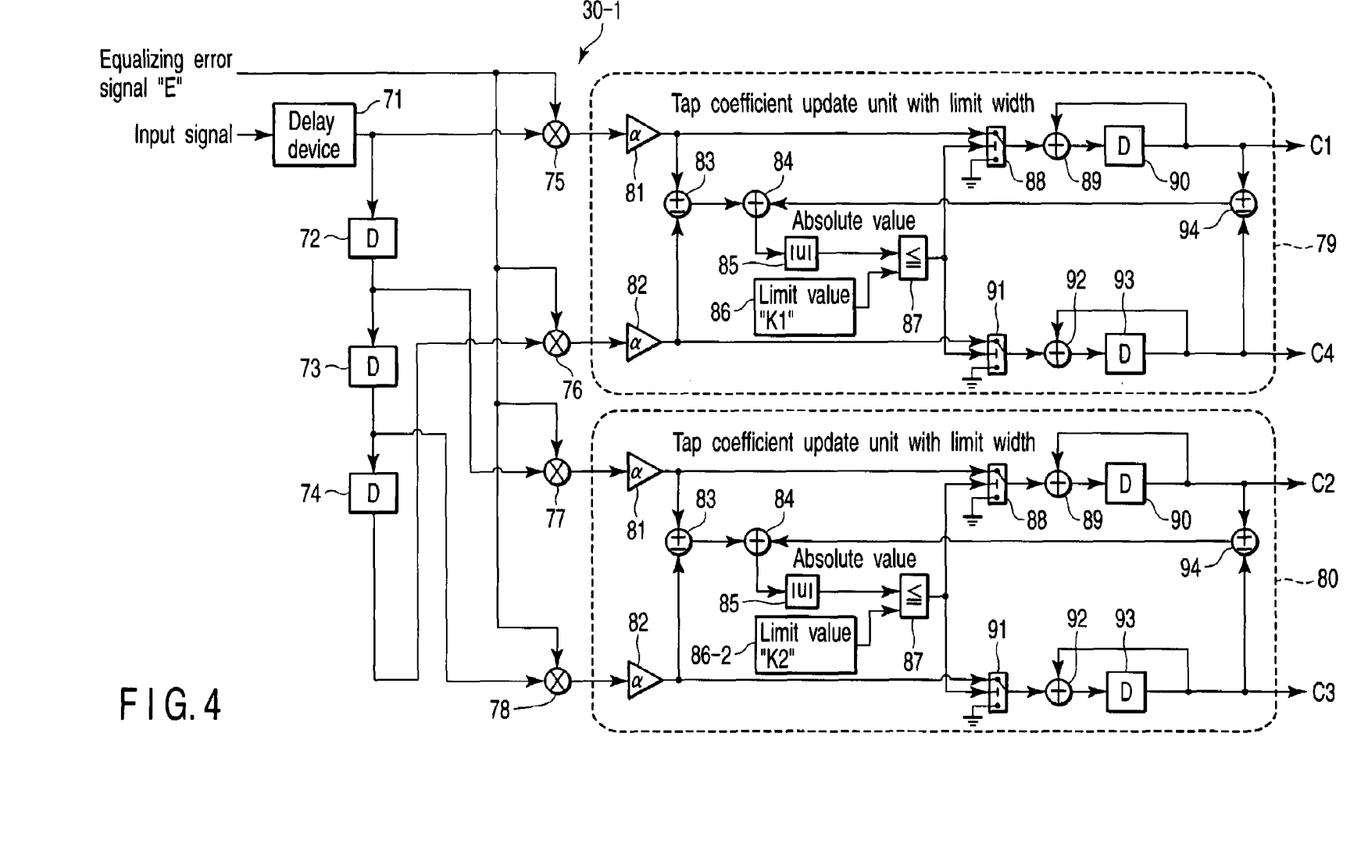
FIG. 4 is a block diagram depicting an example of a configuration of an even numbered tap coefficient controller of the optical disk apparatus according to the invention.
Figure 5:
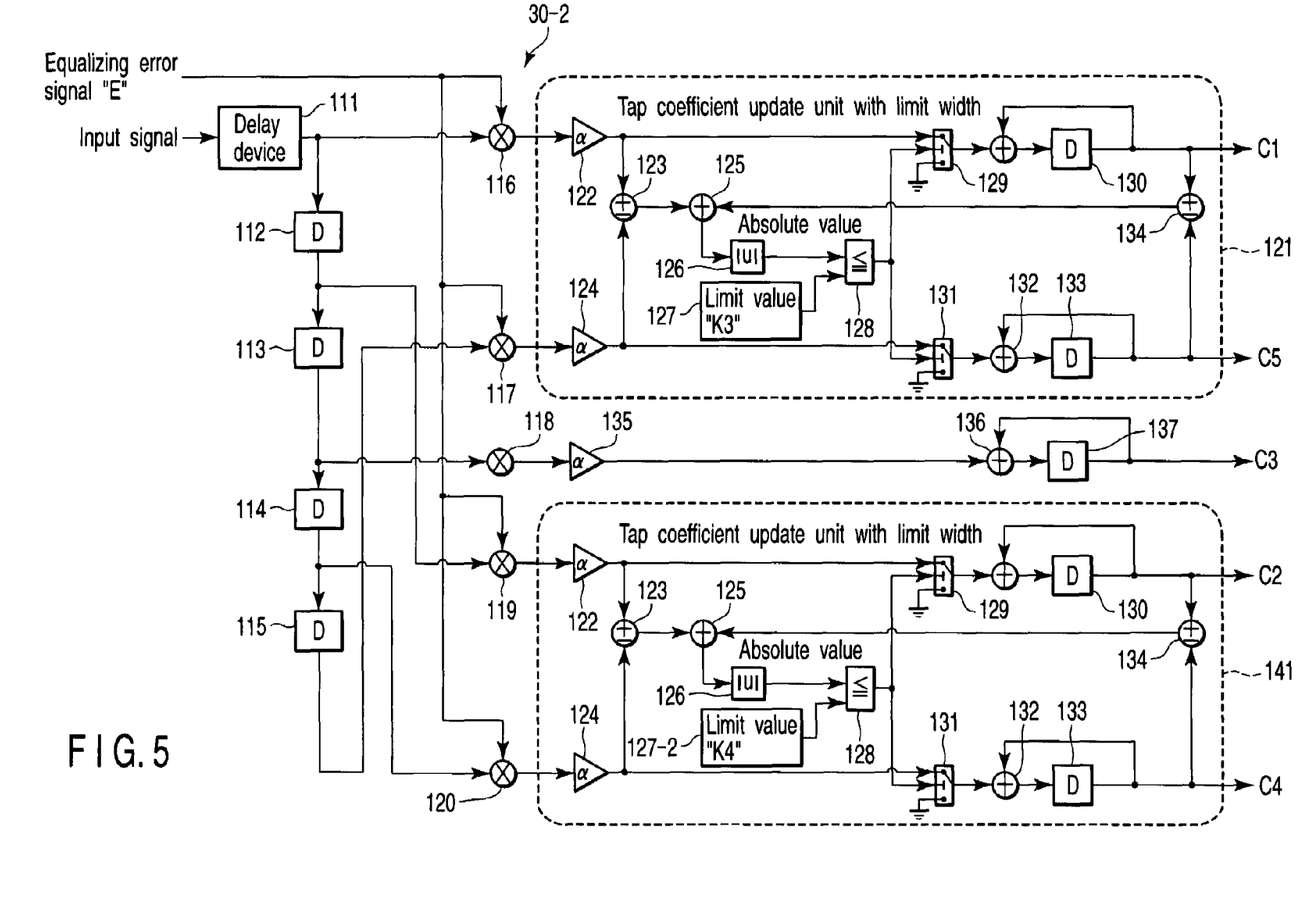
FIG. 5 is a block diagram depicting an example of a configuration of an odd numbered tap coefficient controller in the optical disk apparatus according to the invention.

Hereinafter, embodiments of the present invention will be described in detail with reference to the accompanying drawings by way of example of an optical disk apparatus. FIG. 1 a block diagram depicting an example of a configuration of an optical disk apparatus according to the present invention. FIG. 2 is a block diagram depicting an example of a configuration of an even numbered tap adaptive equalizer in the optical disk apparatus according to the invention. FIG. 3 is a block diagram depicting an example of a configuration of an odd numbered adaptive equalizer in the optical disk apparatus according to the invention. FIG. 4 is a block diagram depicting an example of a configuration of an even numbered tap coefficient controller of the optical disk apparatus according to the invention. FIG. 5 is a block diagram depicting an example of a configuration of an odd numbered tap coefficient controller in the optical disk apparatus according to the invention.

Example of Optical Disk Apparatus According to the Present Invention

Basic Configuration

An optical disk apparatus according to the present invention, as shown in FIG. 1, has a PUH 11 for reading reflection light from an optical disk D and outputting a read signal; a preamplifier 12 connected to the PUH, the preamplifier carrying out amplification; and a waveform equalizing unit 13 for carrying out waveform equalization for a signal from the preamplifier. Further, this apparatus has: a VGA (Variable Gain Amplifier) 14 supplied with a waveform equalized signal, the VGA being controlled by a gain control unit 19; an ADC (Analog to Digital Converter) 15 controlled by an offset/asymmetry control unit 20; an offset/asymmetry eliminating unit 16 controlled by an offset/asymmetry control unit 21; an adaptive equalizer 17 for carrying out a PR equalizing process by using a tap coefficient; a Viterbi decoder 18 for decoding an equalized signal A; an ideal signal/error signal calculating unit 22 for generating an ideal signal from the signal after decoded and outputting an error signal E; a tap coefficient control unit with a limit 30 for controlling a tap coefficient from the error signal E; an ECC processing unit 41 for carrying out error correction upon the receipt of an output of the Viterbi decoder 18; an MPEG encoder/decoder 42 for carrying out an MPEG decoding process of a detection signal after error corrected; an interface (I/F) unit 43 for supplying a decoded output to an external device; and a modulating unit 44 for modulating a signal during a recording process. In addition, the optical disk apparatus has an optical disk type identifying unit 32 for determining type of the optical disk and outputting an identification signal S; and a control unit 31 such as a CPU, a RAM, or a ROM for receiving the identification signal S and controlling a whole operation or controlling a limit value of a tap coefficient control unit described later, in response to this signal.

Adaptive Equalizer

The adaptive equalizer 17 has single clock delay circuits 50, 51, and 52 each connected to an input terminal in an even numbered tap adaptive equalizer 17-1 shown in FIG. 2. Further, this adaptive equalizer has multiplier circuits 53, 54, 55, and 56 for multiplying tap coefficients C1, C2, C3, and C4, respectively. Moreover, this adaptive equalizer has an adder circuit 57 for summing the plurality of multiplication results, and outputs an equalizing output signal A.

In addition, the adaptive equalizer 17 has single clock delay circuits 60, 61, 62, and 63 each connected to an input terminal in an odd numbered adaptive equalizer 17-2 shown in FIG. 3. Further, this adaptive equalizer 17 has multiplier circuits 64, 65, 66, 67, and 68 for multiplying tap coefficients C1, C2, C3, C4, and C5, respectively. Moreover, this adaptive equalizer has an adder circuit 69 for summing the plurality of multiplication results, and outputs an equalizing output signal A.

Tap Coefficient Control Unit with Limit

The tap coefficient control unit with a limit 30 has: single clock delay circuits 72, 73, and 74 for, in the case of an even numbered tap coefficient controller 30-1 shown in FIG. 4, receiving an output of a delay device 71; multiplier circuits 75, 76, and 77 for multiplying each of outputs of these delay circuits and the equalizing error signal E. The tap coefficient control unit with a limit 30 also has coefficient update units with limit values 79 and 80 for receiving outputs of the multiplier circuits 75, 76, 77, and 78.

Here, the coefficient update unit with a limit value 79 has amplifiers 81 and 82 for receiving outputs of the multiplier circuits 75 and 76, respectively. This update unit has: an adder 83 for adding each output; an adder 84 for receiving such each output; and a computing operator 85 for computing an absolute value of the output of the adder 84; and a limit value unit 86 for supplying a limit value of control which is a feature of the present invention. Here, the limit value unit 86 can set a value K1, for example, which is greater than that of a limit value unit 86-2 described later. The value given here is arbitrary, and in particular, an effect of a tangential tilt can be effectively limited by providing a greater value.

The coefficient update unit with a limit value 79 also has: a computing operator 87 for receiving an absolute value from the computing operator 85 and a limit value of the limit value unit 86 and outputting the absolute value which is equal to or smaller than the range of the limit value; a switch unit 88 for receiving an output of the computing operator 87 and an output of the amplifier 81; a switch unit 91 for receiving an output of the computing operator 87 and an output of the amplifier 82; and adders 89 and 92 for receiving an output of each of the switch units 88 and 91; delay circuits 90 and 93 for retaining outputs of the adders 89 and 92; and an adder 94 for adding outputs of the delay circuits 90 and 93 and outputting the addition to the adder 84. The delay circuits 90 and 93 output tap coefficients C1 and C 4, respectively.

Similarly, the coefficient update unit with a limit value 80 has amplifiers 81 and 82 for receiving outputs of the amplifier circuits 75 and 76, respectively. This coefficient update unit has an adder 83 for adding each output; an adder 84 for receiving such an output; a computing operator 85 for computing an absolute value of the output of the adder 84; and a limit value unit 86-2 for supplying a limit value of control, which is a feature of the invention. Here, the limit value unit 86-2 can set a value K2, for example, which is smaller than that of the above-described limit value unit 86. The value given here is arbitrary.

The coefficient update unit with a limit value 80 further has: a computing operator 87 for receiving an absolute value from the computing operator 85 and a limit value of the limit value unit 86-2 and outputting the absolute value which is equal to or smaller than the range of the limit value; a switch unit 88 for receiving an output of the computing operator 87 and an output of the amplifier 81; a switch unit 91 for receiving an output of the computing operator 87 and an output of the amplifier 82; adders 89 and 92 for receiving an output of each of the switches 88 and 91; delay circuits 90 and 93 for retaining outputs of the adders 89 and 92; and an adder 94 for adding outputs of the delay circuits 90 and 93 and outputting the addition to the adder 84. The delay circuits 90 and 93 output tap coefficients C2 and C3, respectively.

In addition, the coefficient control unit with a limit 30 has: single clock delay circuits 112, 113, and 114 for, in the case of an even numbered tap coefficient control 30-2 shown in FIG. 5, receiving an output of a delay device 111; a multiplier circuit 116 for multiplying outputs of these delay circuits and the equalizing error signal E. Further, a tap coefficient control unit with a limit 121 further has: coefficient update units with limit values 121 and 141 for receiving outputs of the multiplier circuits 116 and 117; an amplifier 135 which is a constituent element for a central tap; an adder 136 for adding such outputs; and a delay circuit 137 for retaining an output of the adder 136, and outputs a tap coefficient C3.

Here, the coefficient update unit with a limit value 121 has amplifiers 122 and 124 for receiving outputs of the multiplier circuits 116 and 117, respectively. This coefficient update unit also has: a differentiator 123 for receiving each output; a differentiator 125 for receiving such each output; a computing operator 126 for computing an absolute value of an output of the differentiator 125; and a limit value unit 127 for supplying a limit value of control, which is a feature of the present invention. Here, the limit value unit 127 can set a value K3, for example, which is greater than that of a limit value unit 127-2 described later. The value given here is arbitrary. By providing a greater value, in particular, an effect of a tangent tilt can be effectively limited.

The coefficient update unit with a limit value 121 further has: a computing operator 128 for receiving an absolute value from the computing operator 126 and a limit value K3 of the limit value 127 and outputting the absolute value which is equal to or smaller than the range of the limit value; a switch unit 129 for receiving an output of the computing operator 128 and an output of the amplifier 122; a switch unit 131 for receiving an output of the computing operator 128 and an output of the amplifier 124; an adder for receiving an output of each of the switch units 129 and 131; delay circuits 130 and 133 for retaining such an output; and an adder 134 for adding outputs of the delay circuits 130 and 133 and outputting the addition to the differentiator 125. The delay circuits 130 and 133 output tap coefficients C1 and C5, respectively.

Similarly, the coefficient update unit with a limit value 141 has amplifiers 122 and 124 for receiving outputs of the multiplier circuits 116 and 117, respectively. This coefficient update unit also has: a differentiator 123 for adding each output; a differentiator 125 for receiving such an output; a computing operator 126 for computing an absolute value of an output of the differentiator 125; and a limit value unit 127 for supplying a limit value of control, which is a feature of the present invention. Here, the limit value unit 127-2 can set a value, for example, which is smaller than that of the above-described limit value unit 127. The value given here is arbitrary.

In addition, the coefficient update unit with a limit value 141 further has: a computing operator 128 for receiving an absolute value from the computing operator 126 and a limit value K3 of the limit value unit 127 and outputting the absolute value which is equal to or smaller than the range of the limit value; a switch unit 129 for receiving an output of the computing operator 128 and an output of the amplifier 122; a switch unit 131 for receiving an output of the computing operator 128 and an output of the amplifier 124; an adder for receiving an output of each of the switch units 129 and 131; delay circuits 130 and 133 for retaining such an output; and an adder 134 for adding outputs of the delay circuits 130 and 133 and outputting the addition to the differentiator 125. The delay circuits 130 and 133 output tap coefficients C2 and C4, respectively.

Limit Mode Switch

Figure 6:
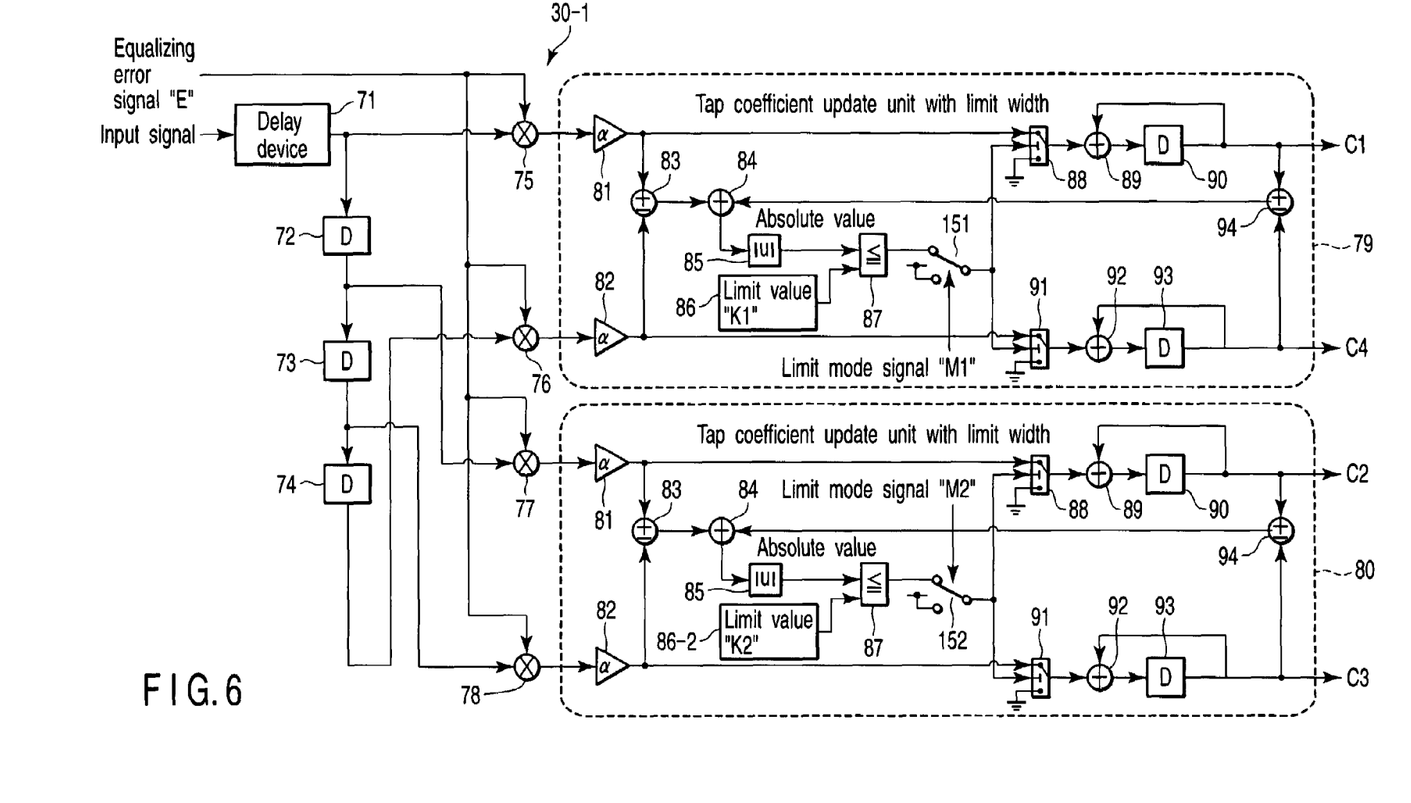
FIG. 6 is a block diagram depicting an example of a configuration of an even numbered tap coefficient controller with a mode switch in the optical disk apparatus according to the invention.
Figure 7:
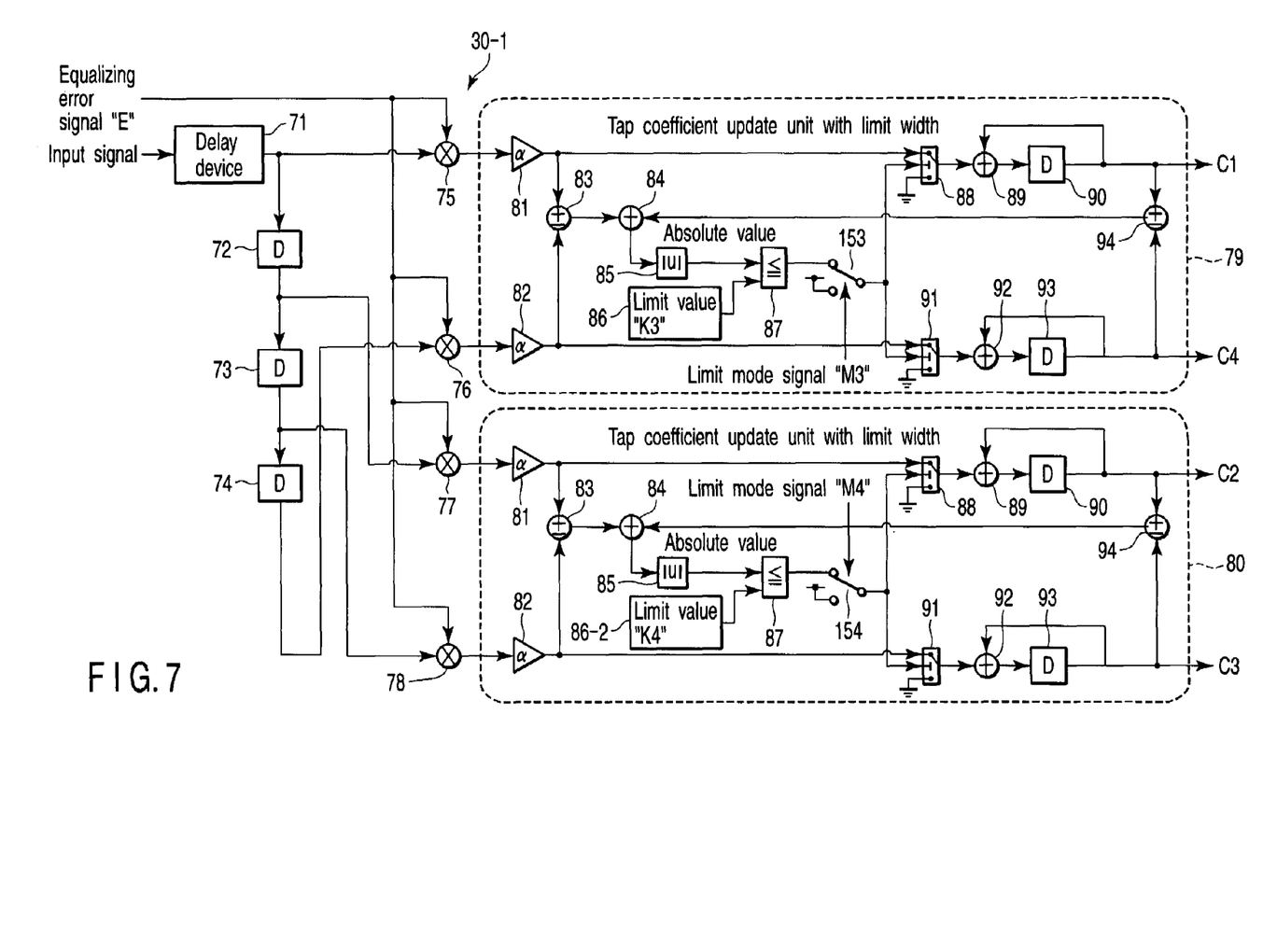
FIG. 7 is a block diagram depicting an example of a configuration of an even numbered tap coefficient controller with a mode switch in the optical disk apparatus according to the invention.

The coefficient update units with limits 79, 80, 121, and 141 shown in FIGS. 6 and 7 further have limit mode switches 151 to 154. These limit mode switches 151 to 154 receive limit mode signals M1 to M4 from a control unit, for example. Here, as an example, if the limit mode signal Ml or the like is active, the switch 151 selects an output of the computing operator 87, and carries out control limitation of a tap coefficient such as limit values K1 and K2 described later. If the limit mode signal Ml or the like is inactive, the switch 151 selects a power supply potential "H", for example, whereby control limitation is released.

Configuration of Another Optical Disk Apparatus

Figure 8:
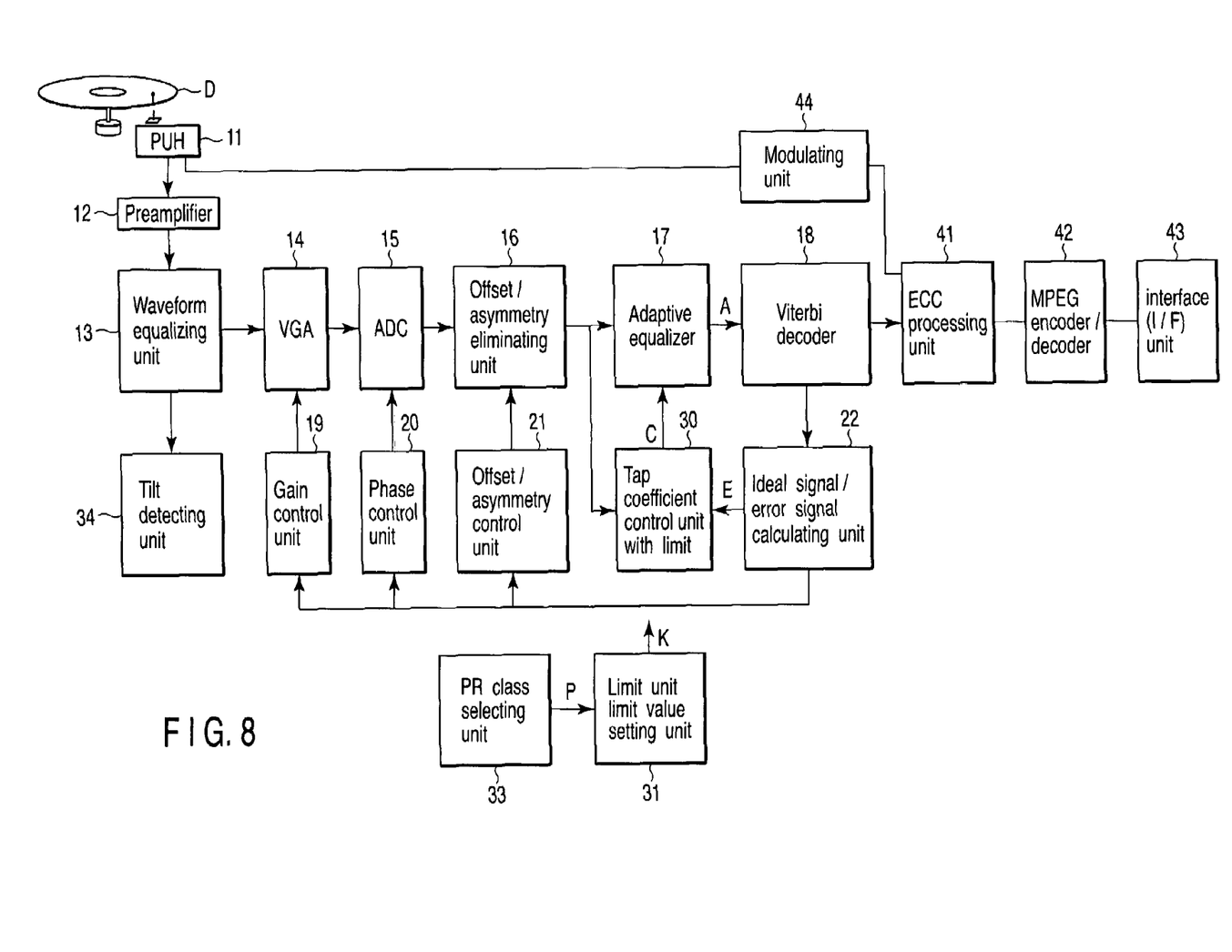
FIG. 8 is a block diagram depicting an example of a configuration of an optical disk apparatus according to the present invention.

Further, an optical disk apparatus according to the present invention, as shown in FIG. 8, has a PR class selecting unit 33 for selecting a PR class for use in the adaptive equalizer 17 or the Viterbi decoder 18, and a PR class selecting signal P is supplied to the control unit 31. Furthermore, a tilt detecting unit 34 connected to the waveform equalizing unit 13 is provided. Such PR class selection signal and tilt detecting signal are preferred as a reference for setting a limit value as described later.

Operation

An optical disk apparatus having such a configuration first reproduces information recorded in the optical disk D as an electrical analog signal which is weak by using the PUH (Pick Up Head) 11. This analog signal is amplified as an RF signal up to a sufficient signal level by the preamplifier 12, and a high widthwise component is boosted at a predetermined level by the waveform equalizing unit 13. Then, in order to eliminate a direct current component, a high pass filter (HPF) (not shown) of about 1 kHz is passed.

Next, an RF amplitude is adjusted as to obtain a proper value by means of a VGA (Variable Gain Amplifier) under the control of the gain control unit 19, and the adjusted value is inputted to the ADC (Analogue to Digital Converter) 15. The ADC 15 converts an RF signal from an analog signal to a digital signal. At this time, a conversion timing is controlled so as to obtain a proper timing by the phase control unit 20.

Next, by means of the offset/asymmetry control unit 21, an offset component and an asymmetry component contained in the RF signal are detected, and the above components are eliminated by the offset/asymmetry eliminator 16.

The thus signal processed RF signal is inputted to the adaptive equalizer 17 in order to equalize a waveform to a target RP class. The adaptive equalizer 17 is composed of a FIR (Finite Impulse Response) filter as shown in FIG. 3, and tap coefficients C1 to C4 are supplied after generated by the tap coefficient control unit with a limit 30.

Although FIG. 3 shows that four tap coefficients are configured, the number of tap coefficients is not limited thereto. For example, as shown in FIG. 4, the number of tap coefficients may be composed of odd numbers. Whether or not an even numbered configuration or an odd numbered configuration is provided depends on an applied PR class, a structure of the phase control unit 20, and the like.

In the tap coefficient control unit with a limit 30-2, an adaptive leaning with a limit value is carried out on the basis of an LMS algorithm, and a tap coefficient is updated with a limit value. Prior to a description of such a learning operation, in order to facilitate a description of the present invention, a description will be given with respect to a tap coefficient control unit using a general LMS algorithm.

Operation of Tap Coefficient Control Using LMS Algorithm

In tap coefficient control using an LMS algorithm, an equalizing error signal is generated in response to a target equalization characteristic by the ideal signal/error signal calculator circuit 22 from an output result of the Viterbi decoder 18. The tap coefficient control unit 22 updates a tap coefficient value so as to minimize a square average value of this equalizing error signal, and changes the value to a desired equalization characteristic.

Specifically, in the case of five tap coefficients in FIG. 5, when a learning operation is expressed by using a formula, the following formula can be expressed as $$Y(t)=X(t)*C1+X(t-1)*C2+X(t-2)*C3+X(t-3)*C4+X(t-4)*C5 \qquad (1),$$

wherein an input signal of the adaptive equalizer 17 in a time "t" is X(t); tap coefficients inputted to the multipliers 116 to 120 are C1 to C5, respectively; and an output of the adaptive equalizer 17 is Y(t).

Binary data obtained by the Viterbi decoder 18 is obtained as A(t) in respect to Y(t). Assuming that a class of a target PR is PR(3 4 4 3), for example, and that A(t) is correct reproducing data, an intrinsic output Z(t) of the adaptive equalizer 17 at a time "t" is expressed by using the formula below:

$$Z(t) = 3*A(t)+4*A(t-1)+ \qquad (2)$$
$$4*A(t-2)+3*A(t-3)-7$$

wherein an equalizing error E(t) at a time "t" is defined by using the formula below.

$$E(t)=Y(t)-Z(t) \qquad (3)$$

This equalizing error E(t) is calculated by the ideal signal/error signal 22 in FIG. 1, and the calculated error is transmitted to the tap coefficient control unit 30.

During an adaptive leaning in the tap coefficient control unit 30, the tap coefficients of the multipliers each are updated in accordance with the formula below by the input signal X(t) and the equalizing error signal E(t).

$$C1(t+1)=C1(t)-\alpha*X(t)*E(t) \qquad (4)$$

$$C2(t+1)=C2(t)-\alpha*X(t-1)*E(t) \qquad (5)$$

$$C3(t+1)=C3(t)-\alpha*X(t-2)*E(t) \qquad (6)$$

$$C4(t+1)=C4(t)-\alpha*X(t-3)*E(t) \quad (7)$$

$$C5(t+1)=C5(t)-\alpha*X(t-4)*E(t) \quad (8)$$

α of Formulas (4) to (8) sets an update coefficient and a small positive value (for example, 0.01). As in the above-described formula, if a tap coefficient is updated, the coefficient is close to a target PR equalization characteristic. However, in actuality, a predetermined amount of delay time occurs until the Viterbi decoder 18 has computed A(k). Thus, in the case of updating a tap coefficient in view of a circuit, there is a need for delaying the input signal X(t) and the output Y(t) of the adaptive equalizer 17 for the same time interval in accordance with the above delay quantity.

Operation of Tap Coefficient Control Unit with Limit

Now, a description will be given with respect to the tap coefficient control unit with a limit 30 in the present application on the basis of the above-described algorithm.

If an ideal condition is established, it is desirable that the same value be set for C1 and C5 and C2 and C3 described above, and a linear phase characteristic be maintained. However, as described previously, there is a need for forming a filter in an asymmetrical shape in order to compensate for a distortion in a time axis direction included in a signal. However, in the case where the degree of freedom is applied infinitely, there is a danger that divergence and incorrect convergence occurs. Thus, by arbitrarily providing a limit value between tap coefficients at a symmetrical location, only compensation for a specified quantity may be carried out. FIG. 5 shows a configuration of the tap coefficient control unit with a limit 30 when the number of taps is 5.

In FIG. 5, an input signal is first delayed by a delay quantity in the Viterbi decoder 18 described previously by the delay device 111. Further, the single clock delay circuits 112 to 115 are passed, input signals X(t) to X(t−4) are generated on a tap by tap basis, and the equalizing error signal E(t) is multiplied by the multipliers 116 to 120. In this manner, an instantaneous evaluation value of a gradient vector on an error curved face is derived out. This result is multiplied by the update coefficient α described previously, whereby an update quantity ΔCn(t) of tap coefficient is generated.

Cn(t) which is a tap coefficient value is stored in the single clock delay circuits 130 and 130 so that a new tap coefficient value is calculated by adding this coefficient value and the above generated update quantity ΔCn.

On the other hand, a limitation between symmetrical tap coefficients is applied together with this operation. A limit value V3 between tap coefficients C1 and C5 is specified by the limit value setting unit 127, and the tap coefficients C1 and C5 are controlled so as to permit the tap coefficients from deviating more significantly than the limit value K3.

Specifically, a difference in update quantity between the tap coefficients (ΔC1−ΔC5) and a difference between the old tap coefficient values (C1(t)−C5(t)) are calculated by the differentiators 123 and 134, respectively. These two sums are calculated by the differentiator 125, thereby predicting a difference between new tap coefficient values (C1(t+1)−C5(t+1)). Further, this predicted value is produced as an absolute value by the absolute value computing operator 126, and the absolute value is compared with the limit value K1 by the comparator 128, thereby determining whether or not to update a tap coefficient. If the predicted value is equal to or smaller than the limit value K1, the comparator outputs "1", and the switches 129 and 131 each select an upper side of the switch. In actuality, the update quantities ΔC1 and ΔC5 are inputted to an integrator, and a tap coefficient is updated. In addition, if the predicted value is greater than the limit value K1, the comparator outputs "0", and the switches 129 and 131 each select a lower side of the switch. Then, inputs of the update quantities ΔC1 and ΔC5 are shut down. Namely, update of the tap coefficient is not carried out.

Similar operation is made between the tap coefficients C2 and C4 as well. However, the limit value is obtained by the limit value K4 specified by the limit value setting unit 127-2. In addition, the central tap coefficient C3 does not have a tap to be combined with. Thus, in FIG. 5, learning is advanced without a limit. However, it is preferable that a range in which the central tap coefficient can move be arbitrarily specified as the limit value K0, for example.

Further, FIG. 4 shows a configuration of the tap coefficient control unit with a limit 30 in the case of an even numbered tap (four taps). In this case as well, similarly, the limit value K1 is provided between tap coefficients, namely between the tap coefficients C1 and C4, and the limit value K2 is provided between the tap coefficients C2 and C3. Unlike a case of the even numbered tap, a central tap coefficient has a tap to be combined with, and thus, limitation is applied to all groups.

As has been described above, a suitable independent limit value (K1 to K4) between tap coefficients is arbitrarily set by working of the limit value setting unit of the control unit 31, for example, whereby a distortion component in a time axis direction can be compensated for while limiting divergence of leaning or the like.

Method for Determining Limit Value

Now, a description will be given with respect to a method for determining a limit value (such as K1 to K4) of control between tap coefficients in asymmetrical leaning with the above limit in the optical disk apparatus according to the present invention. In particular, let us consider a case where a tangential tilt exists on the disk D which becomes a great problem as a distortion component in the time axis direction.

The tangential tilt used here denotes a component in a tangential direction from among the tilts on the surface of the disk D. Namely, a tilt is produced with respect to a laser beam travel direction, and a great distortion occurs in the time axis direction of an RF signal. Thus causes a data error rate to be significantly deteriorated. Thus, in an adaptive equalizer, it is desired that this tangential tilt component be compensated for, and that a data error rate be reduced.

Setting Limit Value Depending on Location of Tap Coefficient

In the case where a tangential tilt occurs on the disk D, in general, it is known that a tap coefficient of a field of view deviating from a central tap coefficient moves greatly. Namely, in order to efficiently compensate for a specified quantity of a tangential tilt, the limit value of control may be determined under the following condition.

$$K_{n+1} \leq K_n \quad (9)$$

The limit value K denotes a limit value between tap coefficients, and "n" indicates a group number between symmetrical tap coefficients. In addition, as "n" is smaller, it indicates a limit value between tap coefficients in the field of view. Therefore, it is preferable that the value of the limit value K be small at the inside thereof and be large at the outside (field of view). Namely, in the examples of FIGS. 5 and 4, the limit value is determined under the condition of K1≦K2, thereby making it possible to effectively carry out compensation of a specified quantity with respect to the tangential tilt. In the case of a tangential tilt equal to or greater than the specified quantity, the divergence of adaptive leaning can be prevented by a limitter.

Setting Limit Value Depending on Disk Type

An effect caused by a tangential tile increases as the number of lens apertures NA is greater after a laser wavelength λ has produced as a short wavelength. Namely, as the optical disk D is higher in density, the degree of allowance with respect to a tangential tilt is reduced. Therefore, in a reproducing apparatus for reproducing optical disks D of a plurality of formats, it is preferable that a limit value be changed according to type of the disk D to be reproduced.

For example, in a next generation DVD using a blue laser light beam, a limit value is increased (a margin of limitation of control is increased), and waveform deterioration due to a tangential tilt is compensated to the maximum so as to improve an error rate. On the other hand, in a currently prevailing DVD using a red laser light beam, if a sufficient error rate is obtained, it is preferable to use a method for reducing the limit value K more significantly, and increasing the degree of safety with respect to an external factor without extremely changing a tap coefficient.

Setting Limit Value Depending on PR Class

A limit value may be controlled so as to be changed depending on a PR class to be equalized by working of the control unit 31. A target equalization characteristic differs depending on the PR class, and thus, a tap coefficient value to be calculated changes as well. Namely, the tap coefficient control unit 30 has limit values KP1 to KLn which correspond to a number of PR classes. In this manner, it becomes possible to switch a current limit value to the control values KP1 to KPn according to the respective PR classes in response to a PR class selecting signal P from the PR class selecting unit 33 of FIG. 8.

Setting Limit Value Depending on Mode Switch

A group of tap coefficients to which limitation is applied may be configured so as to be selectively set by working of the control unit 31 and mode switches 151 to 154. Applying limitation denotes a decreased number of combinations of tap coefficients which can be achieved. Thus, limitation is not applied to a group of tap coefficients to which limitation may not be applied in determination. In FIGS. 6 and 7, the above-described switches 151 to 154 are switches which can selectively set a limit mode. These switches are included in the tap coefficient update units with limits 79, 80, 121, and 141.

Here, for example, if a limit mode signal M1 is active, the switch 151 is turned ON, and the upper side is selected. Then, limitation leaning is carried out between symmetrical tap coefficients. If this limit mode signal M is inactive, the switch 151 is turned OFF. For example, a power signal "H" is supplied, thereby making it possible to disable limitation leaning.

Tilt Detecting Unit

It is preferable that a tangential tilt in the read signal be detected, and the detected tilt be utilized for tap coefficient control by working of the tilt detecting unit 34 shown in FIG. 8. According to a degree of the detected tangential tilt, it is preferable that, as the degree of tangential tilt increases, the limit value L increases as well, or alternatively, the limit value K be properly changed. As an example, only when the tangential tilt in the read signal has been detected by working of the tilt detecting unit 34 shown in FIG. 8, it is preferable to use a method for making a mode switch active to update a tap coefficient while applying a limitation. On the other hand, when the tangential tilt is not detected, it is preferable to use a method for disabling a limitation to the tap coefficient.

A description will be given with respect to an example of asymmetrical leaning with a limit in the case where a limit is selectively set. There occurs a phenomenon that, as a sign for adaptive leaning to diverge, a second greatest tap coefficient value becomes greater than a central tap coefficient value which should be essentially the greatest.

In order to prevent this phenomenon, in an odd numbered tap, it is preferable that a severe limit be provided only between the second greatest symmetrical tap coefficients, and that no limit is provided between the other symmetrical tap coefficients. This setting can prevent divergence of adaptive leaning without losing the degree of freedom in the field of view. Thus, a margin of the tangential tilt can be stably increased. Similarly, in the even numbered tap, it is preferable that a limit is applied only between the central tap coefficient and the second greatest symmetrical tap coefficient, and that no limit is provided between the other symmetrical taps.

Figure 9:
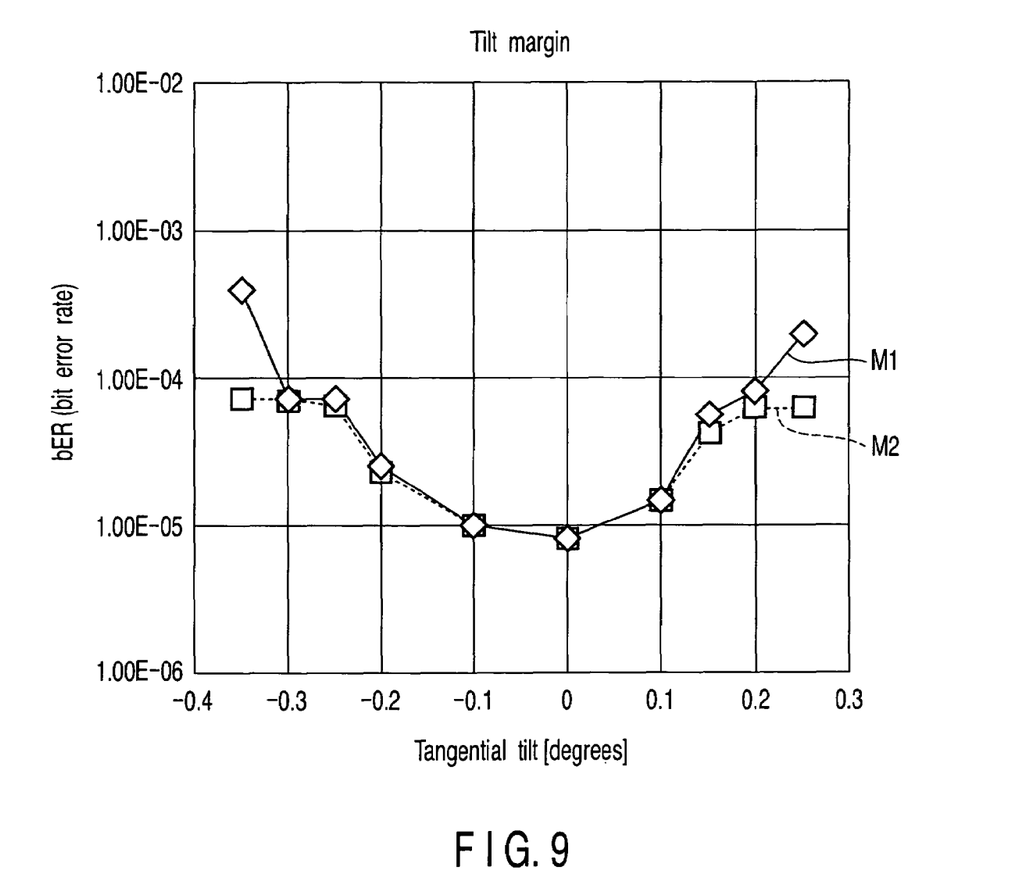
FIG. 9 is a graph depicting a tilt margin improved by the optical disk apparatus according to the invention.

FIG. 9 is a graph showing an effect in the above case. FIG. 9 shows a tangential tilt margin Ml in the case where the same quantity of limit value is provided among all the symmetrical tap coefficients in the odd numbered taps (◇ line) (in the case where the present invention is not utilized); and a tangential tilt margin in the case where a severe limit is provided only between the second greatest symmetrical tap coefficients (□ line) (in the case where the present invention is utilized).

A horizontal axis denotes a tangential tilt, and a vertical axis denotes bER (Bit Error Rate). In the case where a tangential tilt is small, there is no collision with a limit value, and thus, an identical degree of the bER is obtained. In the case where a tangential tilt increases, it is found that the bER is improved when the last method in which the degree of freedom is great.

As described above, a limit of control of a tap coefficient is selectively specified for a symmetrical tap by tap basis, whereby the distortion in the time axis direction is compensated for without losing the degree of freedom and adaptive leaning in which divergence or incorrect convergence is likely to occur can be carried out.

An RF signal PR-equalized by adaptive leaning is lastly inputted to a likelihood decoder for carrying out decoding according to a target PR class, i.e., the Viterbi decoder 18 in this case, and data is decoded as binary data. The Viterbi decoder carries out probability calculation in accordance with a correlation rule on intentionally added codes, based on the target PR class, and simulates the most probable sequence. For example, if a reproducing waveform is equalized to a PR(1221) characteristic by means of adaptive equalization, the Viterbi decoder 18 selects a sequence in which an error with a sample sequence of an equalizing signal is the smallest from among all the sequences which meets the PR(1221) characteristic, and outputs decoding data which corresponds to the selected sequence. In the PRML scheme, decoding is carried out from a plurality of sample values without being carried out from one sample value. Thus, the durability against a signal deterioration component which does not have a correlation among the sample values is strong.

Then, upon the receipt of an output of the Viterbi decoder 18, error correction is carried out by the ECC processing unit 41. Further, a detection signal after error corrected is MPEG-decoded by the MPEG encoder/decoder 42, and a reproducing signal is outputted to an external device or the like via the interface (I/F) unit 43 or the like.

As has been described above, in a disk apparatus according to the present invention and a method for reproducing the disk apparatus, for example, in the disk apparatus using a PRML signal processing scheme, a tap coefficient control unit for supplying a tap coefficient to an adaptive equalizer for carrying out PR equalization at the previous stage controls tap coefficients C1 and C4 or the like in the range of a predetermined limit value (K1) in association with an equalizing error signal E. In the case where the limit value (K1, K2) of given control is not a fixed value, for example, and is tap 4 which is an even numbered tap, the limit value K2 between the central tap coefficients C2 and C3 is not always equal to the limit value K1 between the adjacent tap coefficients C1 and C4. This limit value is obtained as an arbitrarily set value. For example, the limit value K1 of each of the tap coefficients C1 and C4 at the outer periphery side at which an effect of a tangential tilt is likely to occur is set at a value which is greater than the limit value K2 of the tap coefficients C2 and C3 at the inner periphery side, whereby a tap coefficient which can avoid an effect on a tangential tilt more significantly can be set.

In this manner, there can be provided a disk apparatus in which the setting of a proper tap coefficient is provided while restricting an affect of a tangential tilt or the like of a disk, thereby making reliable a decoding process of the RPML signal processing scheme, and an error rate is improved.

The limit value K at this time is not only set at a value corresponding to a tap coefficient, and but also is set at an optimal value according to type of the disk to be reproduced or a PR class for use in an equalizer, for example.

Furthermore, it is preferable to set the limit value K at a proper value in order to restrict an effect of this tangential tilt according to detection of the tangential tilt from a read signal from a pickup. By doing this, when no tangential tilt occurs, operating stability can be allocated by lowly restricting the limit value of the tap coefficient. When a tangential tilt occurs, this effect can be effectively restricted.

One skilled in the art can achieve the present invention in accordance with a variety of the embodiments described above. Further, a variety of modifications of these embodiments can be readily conceived by one skilled in the art, and it is possible to apply to a variety of embodiments even if one skilled in the art does not have inventive capability. Therefore, the present invention encompasses a wide range which does not collide with the disclosed principle and a novel feature, and is not limited to the above described embodiments.

For example, in the following claims or the like, although the case of a combination of a first coefficient group and a second coefficient group is typically recited with respect to the groups of tap coefficients, the number of tap coefficient groups may be increased such as a third coefficient group, a fourth coefficient group and more. Of course, these groups are also included in the claims of the present invention.

What is claimed is:

1. A disk apparatus, comprising:
    a reading unit which reads reflection light from a disk and outputs a read signal;
    an equalizing unit which carries out partial response (PR) equalization for the read signal based on a plurality of tap coefficients;
    a decoding unit which carries out a decoding process for the read signal equalized by the equalizing unit;
    a calculating unit which obtains an ideal signal of the decoded read signal, and compares the ideal signal and the decoded read signal with each other, thereby calculating an error signal; and
    a control unit configured to:
    group the tap coefficients into at least a first coefficient group and a second coefficient group which are groups of tap coefficients at symmetrical locations each,
    determine tap coefficients of the first coefficient group at least in a range of a first limit value according to the calculated error signal, and
    determine tap coefficients of the second coefficient group in a range of a second limit value which is different from the first limit value, and supplies the determined tap coefficients to the equalizing unit, so as to control an equalizing process,
    wherein, if at least the first coefficient group is more outward than the second coefficient group with respect to a central tap coefficient, the first limit value for restricting update of a tap coefficient is not less than the second limit value.

2. A disk apparatus according to claim 1, wherein, when the tap coefficient of the equalizing unit is an odd numbered tap, the limit value is set at only a coefficient group which is a second greatest one of the central tap coefficient, and when the tap coefficient of the control unit is an even numbered tap, the limit value is set at only a coefficient group which belongs to the central tap coefficient and a coefficient group which is a second greatest one of the central tap coefficient.

3. A disk apparatus according to claim 1, further comprising:
    an identifying unit which identifies type of the disk and outputs an identification signal, wherein the control unit changes at least one of the limit values according to the identification signal.

4. A disk apparatus according to claim 1, further comprising:
    an identifying unit which identifies type of the disk and outputs an identification signal, wherein, when the identification signal has been changed from a signal indicating a red laser DVD to a signal indicating a blue laser DVD, the control unit significantly changes at least one of the limit values.

5. A disk apparatus according to claim 1, wherein the decoding unit has a plurality of decoding units according to different PR classes, and the control unit has a different limit value on a PR class by class basis, for determining a tap coefficient according to the different PR classes.

6. A disk apparatus according to claim 1, further comprising:
    an identifying unit which identifies type of the disk and outputs an identification signal,
    the decoding unit having a plurality of decoding units according to different PR classes, the control unit having a different limit value on a PR class by class basis, for determining a tap coefficient according to the different PR classes,
    wherein the control unit controls one of a plurality of decoding units to be selected according to the identification signal, thereby selecting one of the different limit values according to type of the disk.

7. A disk apparatus according to claim 1, further comprising:
    a tilt detecting unit which detects a tangential tilt of the disk based on the read signal from the reading unit,
    the control unit controlling at least one of the limit values to be changed when the tangential tilt is detected.

8. A disk apparatus according to claim 1, further comprising:
a tilt detecting unit which detects a value of a tangential tilt of the disk based on the read signal from the reading unit,
the control unit controlling at least one of the limit values to be changed when it is detected that the value of the tangential tilt is greater than a predetermined value.

9. A disk apparatus according to claim 1, wherein the control unit releases a limit of said first limit value according to a given predetermined signal, and determines a tap coefficient according to the calculated error signal to supply the determined tap coefficient to the equalizing unit.

10. A disk reproducing method comprising:
reading reflection light from a disk and outputting a read signal;
carrying out partial response (PR) equalization for the read signal based on a plurality of tap coefficients;
carrying out a decoding process for the equalized read signal;
obtaining an ideal signal of the decoded read signal, and comparing the ideal signal and the decoded read signal with each other, thereby calculating an error signal; and
grouping the tap coefficients into at least a first coefficient group and a second coefficient group which are groups of tap coefficients at symmetrical locations each;
determining tap coefficients of the first coefficient group at least in a range of a first limit value according to the calculated error signal;
determining tap coefficients of the second coefficient group in a range of a second limit value which is different from the first limit value; and
supplying the determined tap coefficients, so as to control an equalizing process,
wherein, if at least the first coefficient group is more outward than the second coefficient group with respect to a central tap coefficient, the first limit value for restricting update of a tap coefficient is not less than the second limit value.

11. A disk reproducing method according to claim 10, wherein, when the tap coefficient of the equalizing unit is an odd numbered tap, the limit value is set at only a coefficient group which is a second greatest one of the central tap coefficient, and when the tap coefficient of the control unit is an even numbered tap, the limit value is set at only a coefficient group which belongs to the central tap coefficient and a coefficient group which is a second greatest one of the central tap coefficient.

12. A disk reproducing method according to claim 10, wherein
type of the disk is identified to output an identification signal, and at least one of the limit values is changed according to the identification signal.

13. A disk reproducing method according to claim 10, wherein type of the disk is identified to output an identification signal, and when the identification signal has been changed from a signal indicating a red laser DVD to a signal indicating a blue laser DVD, at least one of the limit values is significantly changed.

14. A disk reproducing method according to claim 10, wherein the decoding unit for the decoding process has a plurality of decoding units according to different PR classes, and a different limit value (KP) on a PR class by class basis, for determining a tap coefficient according to the different PR classes, is used.

15. A disk reproducing method according to claim 10, wherein type of the disk is identified to output an identification signal,
the decoding unit has a plurality of decoding units according to different PR classes, and a different limit value on a PR class by class basis, for determining a tap coefficient according to the different PR classes, is used, and
one of a plurality of decoding units is selected according to the identification signal, thereby selecting one of the different limit values according to type of the disk.

16. A disk reproducing method according to claim 10, wherein a tangential tilt of the disk is detected based on the read signal, and
at least one of the limit values is changed when the tangential tilt is detected.

17. A disk reproducing method according to claim 10, wherein a value of a tangential tilt of the disk is detected based on the read signal, and
at least one of the limit values is changed when it is detected that the value of the tangential tilt is greater than a predetermined value.

18. A disk reproducing method according to claim 10, wherein a limit of said first limit value is released according to a given predetermined signal, and a tap coefficient is determined according to the calculated error signal to supply the determined tap coefficient.

* * * * *